F. O. ALBERTSON.
VALVE GRINDER.
APPLICATION FILED SEPT. 20, 1917.

1,282,018.

Patented Oct. 22, 1918.

Witnesses:

Inventor
Frans O. Albertson
By Williams Bradbury &c
Attorneys

UNITED STATES PATENT OFFICE.

FRANS O. ALBERTSON, OF SIOUX CITY, IOWA, ASSIGNOR TO ALBERTSON & COMPANY, OF SIOUX CITY, IOWA, A CORPORATION OF IOWA.

VALVE-GRINDER.

1,282,018.  Specification of Letters Patent.  Patented Oct. 22, 1918.

Application filed September 20, 1917. Serial No. 192,237.

*To all whom it may concern:*

Be it known that I, FRANS O. ALBERTSON, a subject of the King of Sweden, residing at Sioux City, in the county of Woodbury and State of Iowa, have invented a certain new and useful Improvement in Valve-Grinders, of which the following is a full, clear, concise, and exact description, reference being had to the accompanying drawings, forming a part of this specification.

This invention relates to devices for grinding or refacing valves, and particularly valves of the puppet type commonly employed in connection with internal combustion engines. Broadly the object of the present invention resides in the provision of a valve grinder whose characteristics include simplicity, efficiency and cheapness.

Although some of the features of the present invention may be utilized in connection with other types of valve grinders, I have shown them in the accompanying drawing applied to the preferred form of grinder, which is of the type including a progressively advancing oscillatory driven member. In the oscillatory progressively advancing valve grinder, it has been the practice to employ a plurality of bevel gears, usually three bevel gears, two of which are mutilated and arranged to coöperate with the third to oscillate the latter and advance it progressively. To reduce the cost of manufacture I have devised an arrangement whereby it is possible to obtain the same mechanical result with spur gears and in the preferred form of the invention these spur gears are stamped from sheet material.

A further object of the present invention resides in the provision of self-adjusting bearing mechanism for the driven or oscillatory part of the grinder. Another object is the provision of a simple, cheap and effective arrangement for maintaining the power applying shaft or driving shaft of the grinder in proper position with respect to the driven or oscillatory shaft thereof.

These and other objects of the present invention will be pointed out more clearly in connection with the accompanying drawings, wherein—

Similar characters of reference refer to similar parts throughout the several views.

Figure 1:
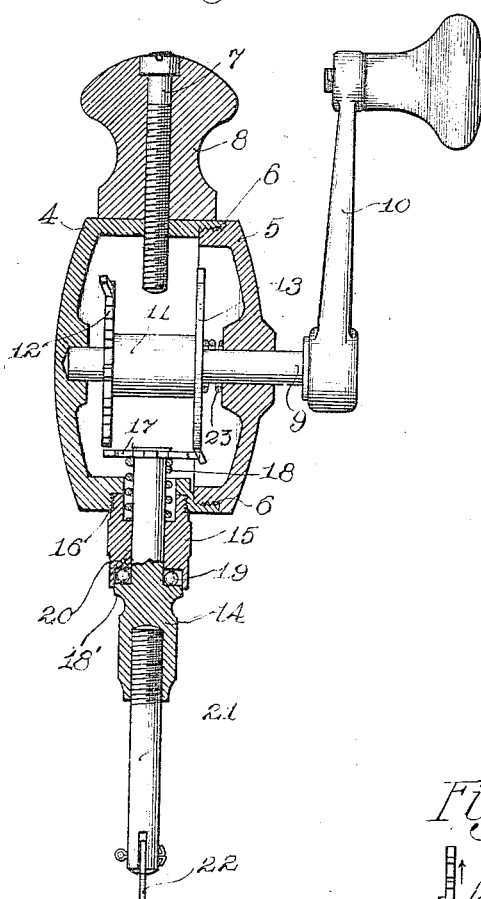
Figure 1 is a vertical cross sectional view of one form of valve grinder embodying the novel features of my invention, some of the parts being shown in elevation.
Figure 2:
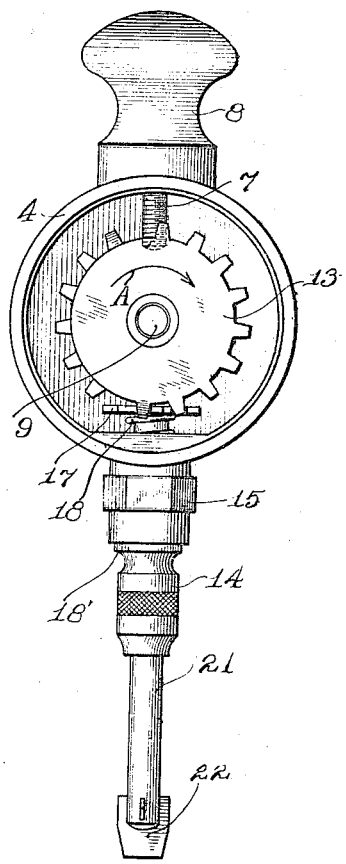
Fig. 2 is a front view of the valve grinder shown in Fig. 1, with the crank and cover plate removed.

As illustrated in Figs. 1 and 2, the valve grinder comprises a cylindrical casing 4 provided with a cover plate 5 adapted for screw threaded engagement with the casing, as shown at 6. Screw-threading into the casing 4 at the upper end thereof is a screw 7, which serves to hold the handle 8 in place. This handle 8 may be constructed of any suitable material, and in the preferred form of my invention is made of wood. Extending through the cover plate 5 and bearing in the cover plate and in the casing 4 is an operating or driving shaft 9. The outer end of the shaft 9 is attached to an operating crank 10. Any convenient arrangement may be utilized for connecting the shaft 9 and crank 10. In the preferred form of my invention the crank 10 is screw-threaded onto the shaft 9. Rigidly fixed to the shaft 9 is a sleeve or collar 11 to which is fixed a pair of mutilated gears 12 and 13. As most clearly shown in Fig. 2, the gears 12 and 13 are mutilated so that one of the gears contains more teeth than the other. Fig. 2 shows the gear 13 as being provided with nine teeth and the gear 12 with six teeth.

Extending through the casing 4 at the lower end thereof and at right angles to the driving shaft 9 is a driven shaft 14 journaled in a bearing member 15 screw-threaded at 16 into the lower end of the casing. Fixed to the upper end of the driven shaft 14 is a spur gear 17 adapted to mesh with both gears 12 and 13. A coiled compression spring 18 is interposed between the bearing member 15 and the spur gear 17, and tends to move the shaft 14 inwardly. The lower end of the shaft 14 is provided with a shoulder 18' arranged to engage a plurality of ball bearings 19 disposed against the shoulder 20 of the bearing 15 and held in place by the bearing, as illustrated. The tendency of the spring 18 is to maintain the shoulder 18' in engagement with the ball bearings at all times.

Screw-threaded into the lower end of the driven shaft 14 is a rod 21 to which is pivoted at its lower end a valve engaging piece 22. This valve engaging piece is arranged to fit into the slot usually provided in puppet valves, so that oscillation of the driven shaft 14 may be transmitted to the valve to be ground or refaced. Mounted around the shaft 9 and interposed between the cover 5 and the gear 13 is a coiled compression spring 23, which serves to hold the shaft 9 in the position shown in Fig. 1, or in other words to hold the left-hand end of the shaft in this figure against the rear wall of the casing 4. This arrangement, although simple, is effective in properly spacing the gears 12 and 13 with respect to the spur gear 17, and maintains the gears in such relationship at all times.

Figure 3:
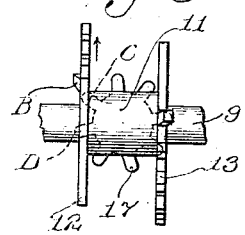
Fig. 3 is a fragmentary plan view of the improved gearing arrangement interposed between the driving and driven shafts.

In the operation of the device the shaft 9 is caused to rotate in the direction indicated by the arrow A. As the teeth of the mutilated spur gear 13 engage the spur gear 17 the shaft 14 is driven in a clockwise direction (Fig. 3), and is advanced in this direction nine teeth. Continued rotation of the shaft 9 brings the gear 12 into mesh with the spur gear 17 to cause the latter to rotate in a reverse direction, and the spur gear 17 is advanced in this direction only six teeth. It will be seen, therefore, that the shaft 14 is given a progressively advancing oscillatory movement. To permit proper meshing of the gears 12 and 13 with the spur gear 17, the foremost tooth of each spur gear 12 and 13 is bent outwardly, as most clearly shown in Figs. 1 and 3. In Fig. 3 I have shown the mutilated spur gear 12 in a position just before it meshes with the spur gear 17. Rotation of the spur gear 12 in the direction indicated by the arrow in this figure causes the foremost tooth shown at B to pass the tooth C of the spur gear 17 and engage the next tooth D of the spur gear 17. It will be seen, therefore, that because of the outwardly bent front teeth, proper meshing of the gears 12, 13 and 17 is permitted. Due to the provision of the compression spring 18 between the shaft 14 and the casing of the valve grinder, the shoulder 18' is held against its coöperating ball bearing at all times. The arrangement just referred to is self-adjusting in that as wear takes place the spring operates to maintain the parts in engagement with one another, and thus prevents the necessity of manually adjusting the parts.

Having thus described my invention, what I claim as new and desire to secure by Letters Patent of the United States is:

1. A valve grinder comprising a driving shaft, a pair of mutilated spur gears on said shaft, a driven shaft, and a spur gear on said driven shaft, said spur gear meshing with said mutilated gears, the foremost tooth of each mutilated spur gear being bent outwardly in a direction away from the axis of the driven shaft.

2. Valve grinding mechanism including a pair of coöperating spur gears whose axes form substantially a right angle, one of the gears being mutilated and having its foremost tooth bent out of alinement with the remaining teeth to provide proper meshing between the teeth.

3. A valve grinder comprising a casing a driving shaft journaled therein, a pair of mutilated gears fixed to the shaft, a driven shaft journaled in the casing and disposed at right angles to the driving shaft, a gear fixed to the driven shaft, and meshing with said mutilated gears, bearing balls between the driven shaft and casing, said driven shaft having an end thrust bearing shoulder, and spring means tending to move the said driven shaft in a direction to maintain the shoulder in engagement with the bearing balls.

4. A valve grinder comprising a casing, a driving shaft journaled therein, a pair of mutilated gears fixed to the shaft, a driven shaft journaled in the casing and disposed at right angles to the driving shaft, a gear fixed to the driven shaft and meshing with said mutilated gears, an end thrust bearing shoulder on said driven shaft, bearing balls between the shoulder and casing on the inner side of said shoulder and outer side of said casing, and spring means for maintaining engagement between the shoulder and bearing balls.

5. A valve grinder comprising a casing having a removable cover plate, the cover plate being provided with an opening and the casing being provided with a socket in alinement with the opening, a driving shaft extending through the opening and into the socket, and a coiled compression spring between the cover and shaft for holding the shaft in place in the socket.

6. A valve grinder comprising a casing having a removable cover plate, the cover plate and casing being provided with coaxial bores, a driving shaft rotatably mounted in the bores, and a coiled compression spring between the cover and shaft for holding the shaft in the bore provided in the casing.

7. A valve grinder comprising a driving shaft, a pair of mutilated spur gears on said shaft, a driven shaft, a spur gear on said driven shaft, meshing with said mutilated gears, and means on the gears on said driving shaft for insuring meshing with the gear of said driven shaft co-acting with the teeth of the driven gear.

In witness whereof, I hereunto subscribe my name this 14th day of September, A. D. 1917.

FRANS O. ALBERTSON.

Witnesses:
C. N. JEPSON,
EDWD. PEARSON.